Patented May 25, 1954

2,679,499

UNITED STATES PATENT OFFICE 2,679,499

AZO TRIAZINE COLORING MATTERS

Robert S. Long, Bound Brook, N. J., and Frederick Brody, New York, N. Y., assignors to American Cyanamid Company, New York, N. Y., a corporation of Maine No Drawing. Application March 25, 1952,
Serial No. 278,504

14 Claims. (Cl. 260—153)

This invention relates to a new class of dyestuffs containing the triazine ring conjugated with at least one azo group.

In the past, a number of dyes have been prepared containing the triazine ring; however, in no case has the azo group been linked to any one of the three carbon atoms of this ring. Attempts to prepare such compounds have uniformly failed, as amino groups attached to the triazine ring will not diazotize, because, strictly speaking, they are not amino groups but amide groups. Similarly, it has been impossible to couple diazo compounds directly to the triazine ring. As a result, in azo dyes containing the triazine ring, this ring has always been connected with the rest of the molecule through a bridging linkage, such as NH. According to the present invention, we have found that it is possible to produce azo compounds with the azo group directly connected to a carbon atom of the triazine ring by reacting an appropriate halogen-substituted triazine with an aromatic hydrazine to produce a mono-, di- or trihydrazinotriazine, as the case may be; and that these hydrazine groups can be oxidized by mild oxidizing agents to the azo group. The resulting compounds constitute a new series in organic chemistry, in which the chromophoric azo group is conjugated with the triazine nucleus. These dyes are available in a wide range of colors, they dye easily or, when insoluble, form good pigments; and many are characterized by excellent fastness properties.

Since the organic radical on the hydrazine may be of the most various types, coloring matters of widely different characteristics are obtainable. Similarly, if one or two of the other carbon atoms of the triazine ring are substituted by other organic radicals, these substituent groups confer their regular characteristics as to dye type. Thus, for example, the presence of sulfonic, or other acid groups either on the hydrazine radical which is later oxidized to azo, or on other substituents of the triazine ring will confer to the dyes affinity for basic nitrogenous fibers, such as wool; and if their configuration is suitable, they are also substantive to cotton. Where there are no acid groups present, the products are pigments and may be used for the various coloring purposes for which organic pigments are suitable. The triazine ring may also contain quinonoid substituents, such as, for example, antraquinonylamino groups, in which case the resulting coloring matter is vattable and may be used as a vat dyestuff.

The process by which the new class of organic compounds of the present invention is prepared does not permit direct development on the fiber, as is the case with many azo dyes. However, the organic radicals on the hydrazine group or groups or on the other carbon atoms of the triazine ring may contain either diazotizable primary amino groups or groups such as hydroxyl, which permit coupling. In such cases, azo coloring matters can be prepared by diazotizing compounds of the present invention containing diazotizable groups and then coupling with ordinary coupling components, or alternatively, where the compound contains groups permitting azoic coupling, by diazotizing the regular aromatic amines and coupling with the compounds of the present invention. The polyazo dyes thus produced can of course be dyed by after development on the fiber, or by other similar azoic dyeing processes which are not directly applicable to the simpler dyes of the present invention in which the only azo groups are those directly attached to the triazine ring. The possibility of producing these polyazo compounds adds a marked flexibility to the present invention, permitting its use in a still wider range of dyeing procedures.

While the compounds of the present invention contain at least one azo group directly connected to a carbon atom of the triazine ring, the intermediate hydrazino compounds are in many, if not most, cases also new chemical compounds. They are, however, not claimed as such in the present application. It is an advantage of the present invention that the method by which the compounds are prepared is generally applicable to almost any halotriazine and hydrazine. The process is claimed in the present application in a specific aspect of the invention, but it should be understood that the new compounds are not intended to be restricted to any method of preparation. They are, for the most part, definite chemical compounds and are claimed as such in the present case, regardless of the method by which they may be prepared.

When less than 3 hydrazino compounds are joined to the triazine ring, the remaining carbon atom or atoms may be unsubstituted; that is to say, united with hydrogen; or they may carry any of the ordinary substituents on triazine rings; of which, of course, halogen is the most common, since most of the triazine compounds are made from halogen-substituted triazines; for example, cyanuric chloride or bromide. The other radicals which are introduced by conventional means include alkyl, aryl, particularly various alkyl and aryl amino groups, aryloxy, alkyl and aryl mercapto and hydroxy, and the like. These groups do not constitute the novel feature of this new series of organic compounds. It is, therefore, not intended to limit the invention to any particular groupings. Their introduction into the molecule is by conventional means.

The preferred process by which it has been found possible to prepare the new series of azo triazines may use and 1,3,5-triazine having at least 1 halogen group. Typical starting materials are the following: cyanuric chloride, methyldichlorotriazine, phenyldichlorotriazine, phenyldibromotriazine, o - chlorophenyldichlorotriazine, (2,5-dichlorophenyl) dichlorotriazine, o-tolyldichlorotriazine, diphenylchlorotriazine, o-methoxyphenyldichlorotriazine, p - bromophenyldichlorotriazine, o - ethoxyphenyldichlorotriazine, p - dimethylaminophenyldichlorotriazine, (p-phenylphenyl) dichlorotriazine, (o - hydroxyphenyl) dichlorotriazine, o-hydroxyphenyldibromotriazine, (2-methoxy-5-chlorophenyl) dichlorotriazine, (2-hydroxy-5-chlorophenyl) dichlorotriazine, (2-methoxy-5-methylphenyl) dichlorotriazine, (2 - methoxy - 3-naphthyl) dichlorotriazine, and (2,4 - dimethoxyphenyl) dichlorotriazine.

Some of the above-enumerated halotriazines are well known compounds. They are not claimed as such in the present invention, except as starting materials for the process of the invention. Some of the compounds, which are new, are, however, described and claimed in the copending applications of Munro, Hardy and Joyce, Serial No. 227,941, filed May 25, 1951, now abandoned, and Joyce and Munro, Serial No. 236,066, filed July 10, 1951. The chlorine-substituted triazines are, of course, the cheapest and therefore preferred. However, the process of the present operation proceeds with equal smoothness with bromine-substituted compounds, such as cyanuric bromide, various alkyldibromotriazines, aryldibromotriazines, dialkyl- and diarylmonobromotriazines, etc. The general applicability of the process of the present invention to halotriazines constitutes one of its important advantages, as it permits the production of a wide range of compounds belonging to the new series.

It is an advantage of the present invention that it is generally applicable to any aromatic hydrazine and one, two or three such groupings may be introduced into the triazine molecule. Typical aromatic hydrazines are the following: phenylhydrazine, p-chlorophenylhydrazine, p-nitrophenylhydrazine, p - acetylaminophenylhydrazine, phenylhydrazine-p-sulfonic acid, 8-hydrazino-1-naphthol-3,6-disulfonic acid, 2-hydrazino-5-naphthol-7-sulfonic acid, 2-hydrazinobenzothiazole, 5 - chloro-2-hydrazinobenzothiazole, 6-ethoxy-2-hydrazinobenzothiazole, 2- hydrazinobenzoxazole, 2-hydrazino-beta-naphthoxazole, 2-hydrazino-alpha-naphthothiazole, 2-hydrazinobenzimidazole and the like.

The introduction of the hydrazine group may be directly to an already substituted triazine. It is also possible and, in many cases desirable, to start with a simple chlorohalotriazine, such as cyanuric chloride or bromide. In this case, it is possible to introduce the aromatic hydrazine groups and non-hydrazine groups in any desired order. Preferably, the aromatic hydrazine groups are first introduced and the remaining active halogens of the triazine ring can then be reacted with other compounds having an active hydrogen by the conventional methods of introducing such groups. For example, various alcohols, such as ethanol and butanol; phenols, such as phenol, cresol, naphthol, naphtholsulfonic acid, etc.; mercaptans, thiophenols, ammonia and aliphatic amines, such as ethylamine, diethylamine and ethanolamine, aromatic amines such as aniline and its homologs and substitution products, naphthylamines, aminoanthraquinones and aminonaphthols, such as 1-amino-8-naphthol-3,6-disulfonic acid, 2-amino-5-naphthol-7-sulfonic acid and 1-amino-7-naphthol may be introduced. It is an advantage of the invention that the introduction of these other groups by conventional means does not adversely affect the aromatic hydrazine group first introduced.

The oxidation of the hydrazine groups to azo groups may be effected before or after all of the groups have been introduced into the triazine ring, or the oxidation may occur spontaneously during isolation of the hydrazines, or during subsequent reactions. The oxidation step proceeds smoothly under ordinary mild oxidizing conditions, and is not limited to the use of any particular oxidizing agent. We have found, however, that ferric chloride and nitrous acid are both cheap and effective and these constitute the preferred mild oxidizing agents, it being understood that the process aspect of the present invention is in no sense limited to the use of these compounds. The reaction proceeds smoothly, preferably in aqueous medium. Temperature is not in any way a critical factor, the reaction proceeding readily at room temperature. Higher temperatures may be used, of course limited by the stability of the azo group produced. Temperatures below room temperature can also be used, but as the reaction slows up, it is not desirable to operate under extremely low temperature conditions. The course of the reaction in practically every instance results in a marked color change and this is an additional advantage of the process, as it provides a convenient index of the progress of the oxidation reaction. Isolation of the resulting product presents no problem and is effected by conventional methods. The isolation step, therefore, as such, does not constitute a part of the present invention.

When it is desired to produce polyazo compounds by diazotizing primary amino groups on the aryl hydrazine or arylazo radical, or on the radicals attached to the other carbon atoms of the triazine ring, this can be easily effected. However, as in the case of most procedures involving successive production of azo linkages, it is often desirable to protect the amino group, during the formation of the azo triazine compound. Here, again, the invention does not require the use of new procedures, and conventional methods, such as protecting the amino group by an acyl group, as in the case of acetyl amino compounds; or reacting a nitro compound, and afterwards reducing, may be employed.

When either the azo radical or the other radicals have groups which permit azoic coupling, the production of polyazo compounds therefrom proceeds by known methods and the azo triazine linkage which is the essential novel feature of the new series of compounds of the present invention has been found not to interfere with normal coupling where suitable groups are present, such as hydroxy, amino and the like. Another class of coloring matters may be produced from the compounds of the present invention. Where there are metallizable groups flanking the azo group, metallization is possible, and such metallized derivatives are included within the scope of the present invention.

Successive transformations by diazotization and coupling and the like may be effected after the hydrazo linkage to the triazine ring has been oxidized to azo. It is, however, not necessary to effect this oxidation first, as the other transformations can be effected while the hydrazo grouping remains and the oxidation may, if desired, constitute the final step. This flexibility of the order in which various reaction steps are undertaken constitutes a further practical operating advantage of the present invention. The possibility of producing polyazo compounds or compounds containing other types of chromophoric structures, such as an anthraquinone nucleus, makes certain color combinations possible which in some instances are of marked practical value. Thus, for example, if one of the chromophoric structures in the molecule is blue, and the other yellow, it is possible to obtain greens by subtractive combination within the molecule itself.

All of the compounds of the present invention contain the ordinary common symmetrical triazine nucleus; that is to say, they are derivatives of 1,3,5-triazine. This is the only triazine ring referred to in the present application and so for simplicity the number designation has been omitted in most references thereto. It should be understood, however, that wherever the term "triazine" is used in the present specification and claims, reference is made to the 1,3,5-triazine ring.

The present invention will be illustrated in the following examples, the parts being by weight unless otherwise specified.

*Example 1*

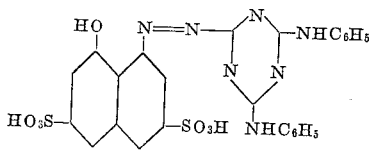

An aqueous solution of 1.78 parts of 8-hydrazino-1-naphthol-3,6-disulfonic acid, neutralized to pH 7, is gradually added at 0° C. to an ice and water suspension of 1.01 parts of cyanuric chloride. During this operation, soda ash solution is added as needed to destroy excess acidity. When the reaction is complete, the solution is boiled with a large excess of aniline. The mixture is then made alkaline and freed of excess aniline by steam distillation. The product is precipitated by acidification, filtered, and slurried with acid and sodium nitrite at room temperature. The product is filtered and may be purified by reprecipitation from water with sodium acetate. It is a dark brown solid, red in alkaline solution and yellow in acid. It dyes wool orange-brown shades.

*Example 2*

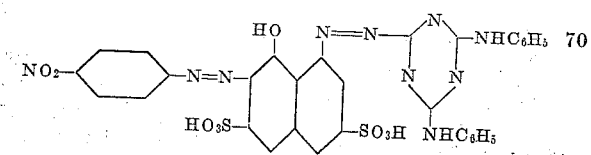

p-Nitroaniline is diazotized by the usual method, and diluted to 0.1 molarity. 125 parts of this solution is gradually added at 0° to 5° C. to 9.1 parts of the product of the preceding example. During this operation, soda ash is added to maintain a weak alkalinity and the reaction mixture is thoroughly stirred at this temperature and then for a time at room temperature. It is then acidified, salted with sodium chloride to saturation, and the product removed by centrifugation and washed with water. It is blue in alkaline solution and bright red in acid. It dyes cotton bluish-red shades.

*Example 3*

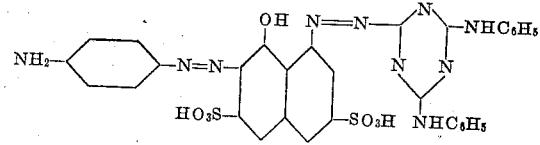

The product of the preceding example is dissolved in 150 parts of water with the addition of caustic, and there is added to it at 35° C. an aqueous solution of 5.0 parts of sodium sulfide nonahydrate. The mixture is warmed to 50°, stirred thoroughly while being allowed to cool, and finally acidified. The product is filtered off, washed thoroughly with 5% brine, and dried at 60° C. It is red in alkaline solution and yellow-red in acid. It dyes wool bluish and cotton bluish-gray shades.

*Example 4*

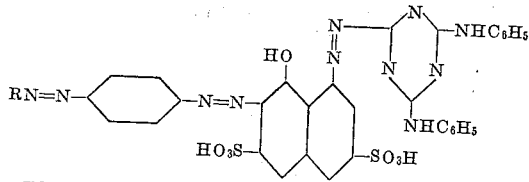

The product of the preceding example is diazotized in the normal way with sodium nitrite and hydrochloric acid and coupled by ordinary methods to give dyestuffs of the following shades on cotton:

| Coupling Component R | Shade |
|---|---|
| Schaeffer's Acid | Blue. |
| R-Salt | Gray. |
| J-Acid | Blue. |

*Example 5*

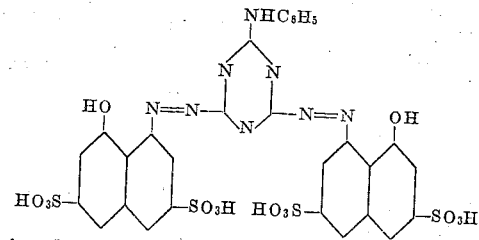

A solution is prepared from 13.4 parts (pure basis) of 8-hydrazino-1-naphthol-3,6-disulfonic acid in 250 parts of water with caustic soda to pH 7. This is gradually added at a temperature of approximately 2° C., to an ice and water slurry of 3.69 parts of cyanuric chloride. Soda ash solution is added as necessary to destroy excess acidity. When the reaction is complete, 20 parts of aniline is added and the solution refluxed for 1 to 2 hours. It is then made alkaline, freed of unreacted aniline by steam distillation and thoroughly salted. The product is filtered and slurried with 21.6 parts of ferric chloride hexahydrate in 500 parts of water. Salt is added to the amount of 10% of the mixture, which is then stirred overnight. The product is filtered, washed with brine, and dried at 50° C. It gives olive dyings on wool.

A slurry of 4.8 parts of p-acetylaminophenylhydrazine (added in the form of its hydrochloride) with alkali at pH 7 is added to 182 parts by volume of a solution prepared as in Example 6. The mixture is heated for several hours at 40–50° C. The product is isolated by acidification and salting. It is red in acid solution and yellow in alkali.

Example 8

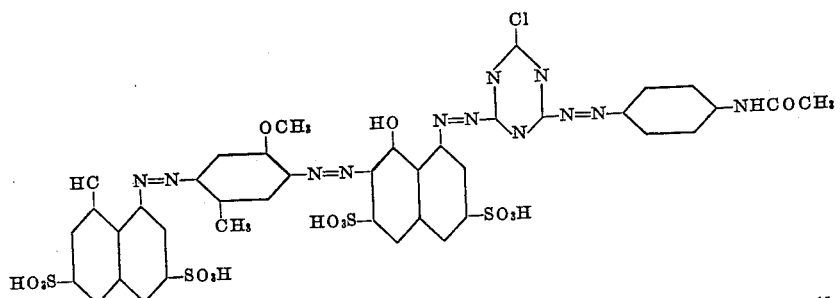

This azo compound can also be prepared with acid nitrite instead of ferric chloride.

Example 6

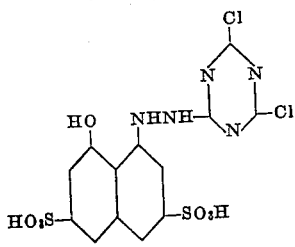

A solution of 37.0 parts (pure basis) of 8-hydrazino-1-naphthol-3,6-disulphonic acid and 42 parts of sodium bicarbonate in 250 parts of water is adjusted with acetic acid to pH 7, and then gradually added at 0° C. to a suspension of 20.3 parts of cyanuric chloride and 200 parts of ice water containing a trace of an emulsifying agent. During this operation, more bicarbonate is gradually added as needed to maintain the pH at 6.5 to 7. After the final addition of a further 0.7 part of bicarbonate, the mixture is stirred thoroughly in the cold, resulting in complete solution. This solution is used as such in the following example.

Example 7

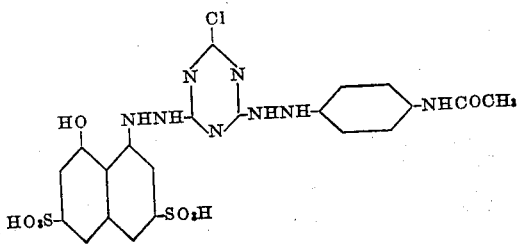

This product of Example 7 is coupled in the ordinary way in aqueous pyridine with the diazo prepared from the coupling product of H-acid on cresidine; the product is completely oxidized to the corresponding azo compound with aqueous ferric chloride as described in the preceding examples. The product gives neutral gray shades on cotton.

Example 9

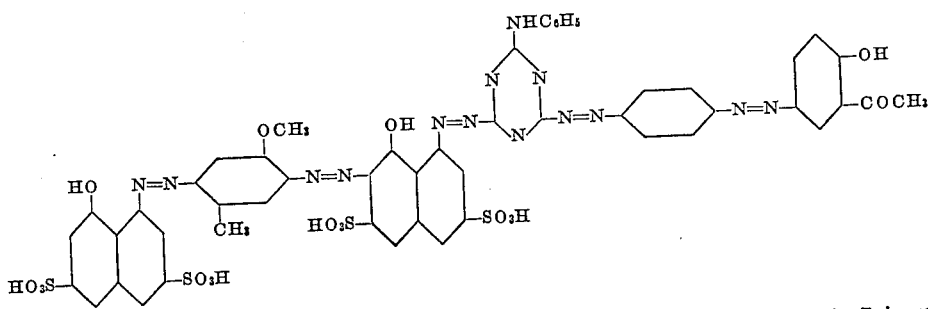

Six parts of the product of Example 7 is refluxed with six parts of aniline in fifty parts of water and, after the condensation is complete, heated with caustic alkali to hydrolyze the acetylamino group. The product is isolated by acidification and salting. It is red-brown in acid solution and yellow-brown in alkali; it is coupled in the ordinary way in alkaline, aqueous pyridine solution with the diazo compound prepared from the coupling product of O-benzenesulfonyl H-acid on cresidine. The product is readily isolated and may be purified by resolution and salting. It is diazotized in the ordinary way with aqueous nitrite, and coupled with salicylic acid in aqueous pyridine solution at pH approximately 8. The product is isolated by acidification and salting, and then washed with brine. The remaining hydrazo linkages are oxidized to azo by slurrying at room temperature with dilute acid and nitrite, and the removal of the benzenesulfonyl group is then accomplished by heating in alkali at 80–85° C. The product may be purified by reprecipitation with sodium acetate. It gives blue-gray dyeings on cotton and rayon.

Example 10

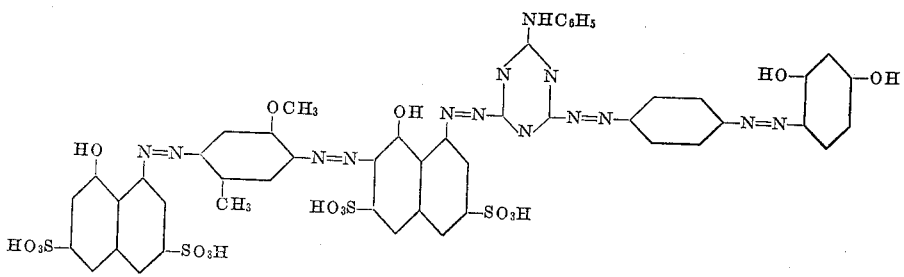

This product is produced by the procedure described in the preceding example, except that the salicylic acid is replaced by resorcinol. Oxidation of any remaining hydrazo linkages is carried out with ferric chloride at room temperature and is followed by hydrolysis of the benzenesulfonyl grouping with aqueous alkali. The product gives reddish gray dyeings on cotton.

Example 11

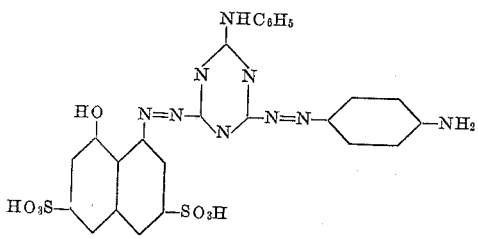

The product of Example 7 is reacted with aniline as described in Example 9. A slurry of 7.0 parts of the resulting product in 100 parts of water is stirred at room temperature with 13.5 parts of ferric chloride hexahydrate until oxidation is complete. The product is filtered and washed with brine. It may be purified by dissolving in ammonia and reprecipitating by acidification and salting.

Example 12

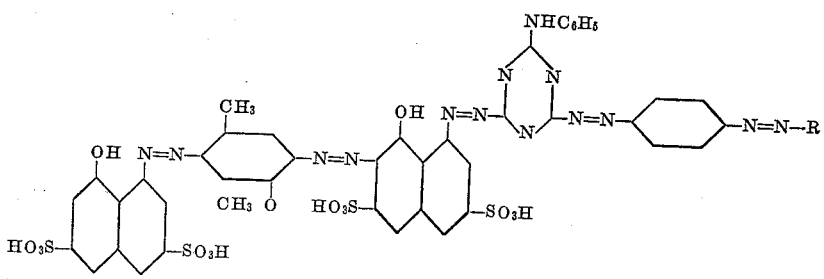

R is residue of either salicylic acid or resorcinol.

Following the procedure of the immediately preceding examples, this product can be coupled with the diazo compound prepared from the coupling product of H-acid on cresidine. The resulting tetrakisazo compound is readily diazotized in the normal way and coupled with salicylic acid or resorcinol to give the same gray dyes.

Example 13

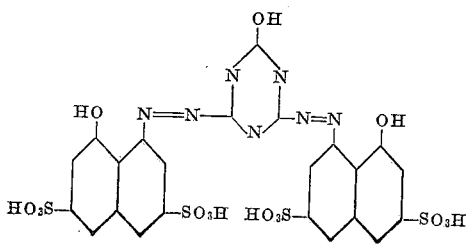

8-hydrazino-1-naphthol-3,6-disulfonic acid and cyanuric chloride are reacted as described in Example 5, the addition of aniline being omitted. The product is isolated by acidification and salting, then being oxidized to the azo compound by slurrying in acidic nitrite solution. It may be purified by precipitation from aqueous solution with alcohol. It is yellow-brown in acid solution and red in alkali. It gives brown dyeings on wool.

Example 14

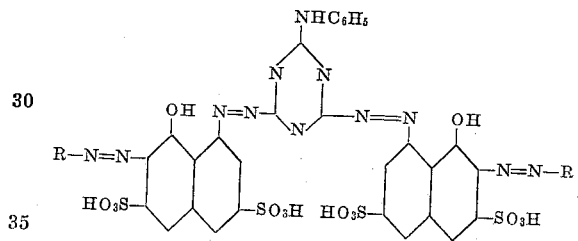

The product of Example 5 is coupled with diazo compounds in the ordinary way, giving the following dyes:

| Diazo Component R | Shade |
| --- | --- |
| p-Chloroaniline | Red. |
| O-Tosyl-H-Acid——→Cresidine | Blue. |

(The O-tosyl group is removed after the coupling.)

Example 15

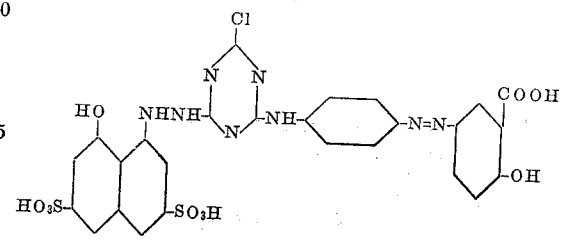

In the manner described in Example 6, 6.09 parts of cyanuric chloride is condensed with 10.0 parts (pure basis) 8-hydrazino-1-naphthol-3,6-disulfonic acid. When the reaction is complete, there is added to the mixture 7.7 parts of p-amino-phenylazosalicylic acid. The reaction is completed by stirring at 40° C. at pH approximately 7.5. Completeness of reaction is indicated by the absence of diazotizable amine. The product is precipitated by salting and filtered.

*Example 16*

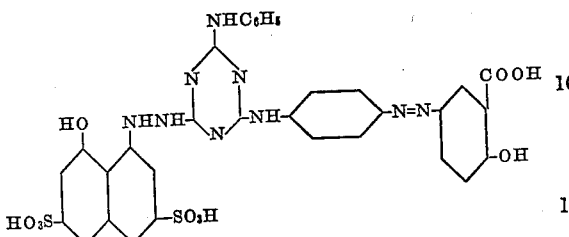

An aqueous slurry of the product of the preceding example with excess aniline is refluxed until the reaction is complete, and then made basic. Unreacted aniline is removed by ether extraction. The product is isolated by salting and filtration. It is blue-red in acid solution and red in strong alkali.

*Example 17*

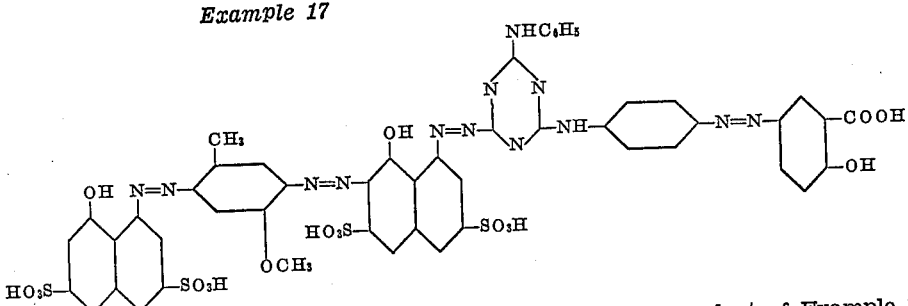

The product of Example 16 is coupled in the ordinary way with the diazo derived from the coupling product of O-benzenesulfonyl-H-acid on cresidine. The product is completely oxidized to the corresponding azo compound with sodium nitrite and acid, and the O-benzenesulfonyl group removed by hydrolysis with caustic. There is then obtained a dye of neutral gray shade.

*Example 18*

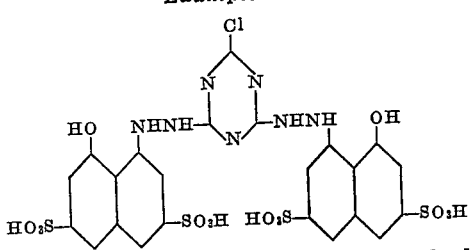

A slurry of 13.4 parts (pure basis) of 8-hydrazino-1-naphthol-3,6-disulfonic acid in 250 parts by volume of a solution prepared as in Example 6 is heated for approximately 3 hours at 50° and pH 6 to 7 until the reaction is complete. The solution can then be used as such for further condensations; for example, reaction with aniline followed by oxidation gives the product of Example 5.

*Example 19*

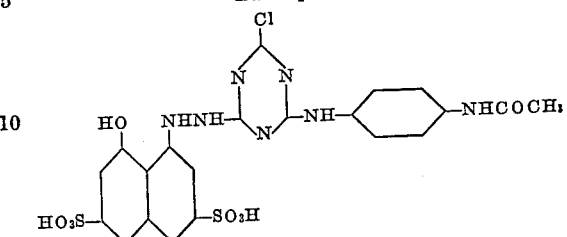

To 250 parts by volume of a solution prepared as in Example 6 is added 6.00 parts (pure basis) of monoacetyl-p-phenylenediamine. The reaction is completed by stirring at 40–50° C., pH being 7.5 throughout. The mixture is acidified, salted and filtered. The product may be purified by reprecipitation from water with 15% by weight of salt. It is red in acid solution and blue-red in alkali.

The product of Example 19 is coupled in the

*Example 20*

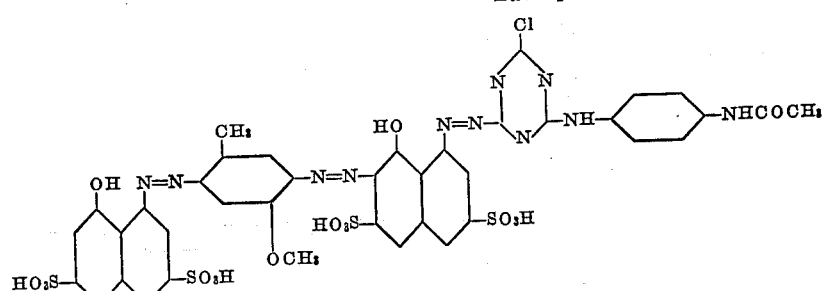

ordinary way with the diazo compound prepared from H-acid coupled on cresidine. Oxidation at room temperature with aqueous ferric chloride converts any remaining hydrazo linkage to azo. The resulting product gives blue-gray dyeings on cotton.

*Example 21*

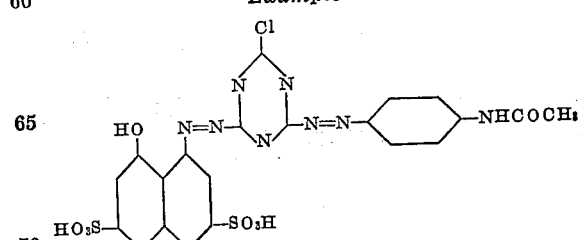

75 parts of water containing 6.7 parts (pure basis) 8 - hydrazino-1-naphthol-3,6-disulfonic acid at pH 7 to 8 is reacted in the ordinary way at 0° C. with 3.69 parts of cyanuric chloride. During the condensation, soda ash is added as needed. This is followed by the addition of 3.2 parts of p-acetylaminophenylhydrazine in the form of its hydrochloride, and additional soda ash to pH 7. The reaction is completed at 40–50° C. The product is then isolated by salting and filtration. It is oxidized to completion by slurrying in water at room temperature with 21.6 parts of ferric chloride hexahydrate, and then filtered. The resulting azo compound may be purified by reprecipitation from aqueous solution with brine. It is red in acid and violet in alkali solution.

*Example 22*

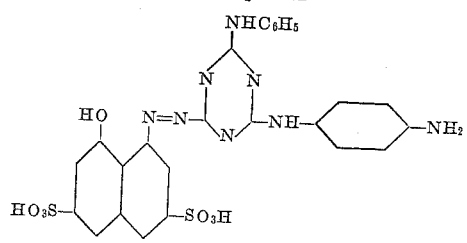

The product of Example 19 is refluxed in water at pH 7 with a large molar excess of aniline. When the condensation is complete, the aniline is removed by alkaline steam distillation. The reaction mixture is then acidified, salted, and filtered.

9 parts of this product is slurried for several hours at room temperature with an aqueous solution of 5.4 parts of ferric chloride hexahydrate, and then filtered. The product may be purified by acid precipitation from ammoniacal solution. It is dark brown.

When coupled in pyridine solution with the diazo prepared from the coupling product of H-acid on cresidine, this product gives a dye which is violet both in acid and alkaline solution and which itself may be diazotized and coupled with salicyclic acid to give a blue-gray dye. If resorcinol is used instead of salicylic acid as the coupling component, the resulting dye is reddish gray.

*Example 23*

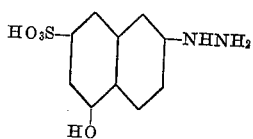

An aqueous paste containing 48 parts of J-acid is dispersed in 400 parts of ice and water and diazotized in the ordinary way with concentrated hydrochloric acid and 5 N sodium nitrite solution. The resulting diazo is poured into a solution of 174 parts of sodium hydrosulfite and 68 parts of anhydrous sodium acetate in 700 parts of ice and water. The reaction is carried out with stirring while the mixture gradually comes to room temperature. The product is then salted out, filtered, and washed with brine. It may be purified by dissolving in caustic and reprecipitating with acid. The yield is good.

*Example 24*

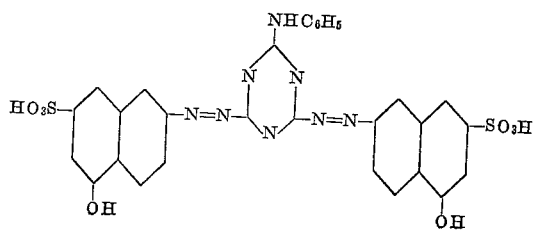

A slurry of 10.7 parts (pure basis) of 2-hydrazino-5-naphthol-7-sulfonic acid, as prepared in the preceding example, in 325 parts of water is adjusted to pH 7 to 8 with caustic. This is then gradually added with stirring to 3.69 parts of cyanuric chloride, the temperature being maintained at 2–5° C., and 10% soda ash solution being added as necessary to maintain the pH at 7 to 8. The reaction is completed by gradual heating to approximately 60° C. 20 parts of aniline is then added. The mixture is refluxed for 1 to 2 hours, made alkaline, freed of unreacted aniline by steam distillation, cooled, acidified, and salted with 10% its weight of sodium chloride.

Oxidation to the azo compound is completed by stirring at room temperature with 21.6 parts of ferric chloride hexahydrate. During this operation the slurry gradually changes in color from pale violet to deep brown. When oxidation is complete, the product is filtered, washed with brine, and dried. It is violet in alkaline solution and red in acid. It gives brown dyeings on wool and silk.

*Example 25*

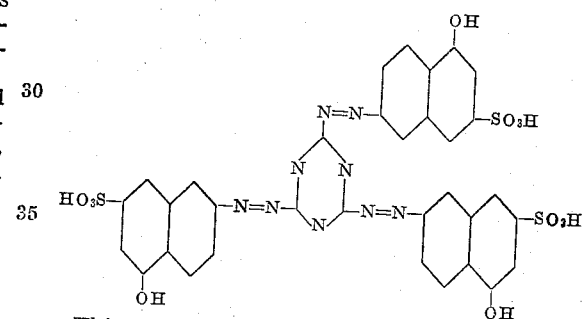

This product can be obtained in a substantially pure state by employing 16.0 parts (pure basis) of J-acid hydrazine in the above procedure and omitting the reaction with aniline.

*Example 26*

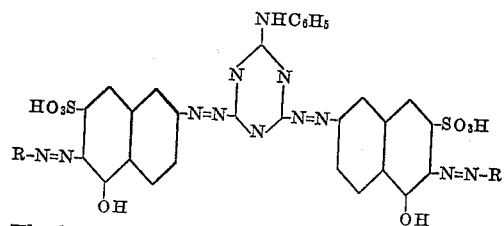

The bis-azo compound of Example 24 is coupled with diazo compounds in the ordinary way giving the following dyestuffs:

| Diazo Component R | Shade |
|---|---|
| Anisidine Sulfonic Acid | Red. |
| o-Aminophenol Sulfonic Acid | Bluish red on cotton and rayon; Brown on wool and silk. |

*Example 27*

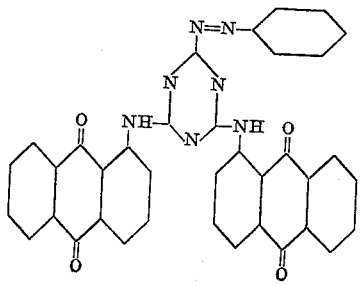

A mixture of 14.0 parts of 2-chloro-4,6-di(alpha - antharquinonylamino) triazine (prepared, for example, as in U. S. Patent 1,663,474) with 5.5 parts of phenylhydrazine and 120 parts of naphthalene is heated at approximately 160° C. for several hours until reaction is complete. The mixture is diluted with cholorbenzene and filtered. The product is washed with chlorobenzene followed by alcohol, and may be recrystallized from chlorobenzene.

Oxidation to the azotriazine of the above formula is effected by slurrying 3 parts of this product in 100 parts of water containing 26 parts of 5 N sulfuric acid and 2 parts of sodium bichromate. The reaction is completed by stirring at room temperature. The product is filtered and washed acid-free. It gives vat yellow dyeings on cotton.

This oxidation may also be effected by alkaline hypochlorite.

We claim:

1. A 2,4,6-substituted 1,3,5-triazine, at least one of the carbon atoms of the triazine ring being bonded to the azo group of an arylazo radical.

2. A compound according to claim 1 in which at least one of the arylazo groups is sulfonated.

3. A compound according to claim 2 in which two of the carbon atoms of the triazine ring are bonded to sulfonated arylazo groups through carbon to nitrogen bonds.

4. A compound according to claim 3 in which the arylazo groups are 3,6-disulfo-8-hydroxy-1-naphthylazo groups.

5. A compound according to claim 4 in which the arylazo groups are 3,6-disulfo-8-hydroxy-7-arylazo-1-naphthylazo groups and the third carbon atom of the triazine ring is united to a phenylamino group through a carbon to nitrogen bond.

6. A compound according to claim 1 in which two of the carbon atoms of the triazine ring are bonded by carbon to nitrogen bonds to arylamino groups and the third carbon atom is bonded to the azo group of a hydroxy-sulfo-napthylazo radical.

7. A compound according to claim 6 in which one of the arylamino groups is anilino and the other is para-arylazo anilino and the naphthylazo radical is 3,6-disulfo-8-hydroxy-7-arylazonaphthylazo.

8. A compound according to claim 1 in which one of the carbon atoms of the triazine ring is bonded by carbon to nitrogen bonds to aniline and the other two carbon atoms of the triazine ring are bonded by carbon to 5-hydroxy-7-sulfo-2-naphthylazo.

9. A compound according to claim 8 in which the hydroxy-sulfo-naphthylazo groups are 5-hydroxy-6-arylazo-7-sulfo-2-naphthylazo.

10. A compound according to claim 1 in which all three of the carbon atoms of the triazine ring are bonded to the azo groups of arylazo radicals.

11. A compound according to claim 10 in which the arylazo radicals are 5-hydroxy-7-sulfo-2-naphthylazo.

12. A compound according to claim 11 in which the 5-hydroxy-7-sulfo-2-naphthylazo group is 5-hydroxy-6-arylazo-7-sulfo-2-naphthylazo.

13. A compound according to claim 1 in which two of the carbon atoms of the triazine ring are bonded by carbon to nitrogen bonding to anthraquinonylamines and the third carbon atom is bonded to the azo group of an arylazo radical.

14. A compound according to claim 13 in which the anthraquinonylamines are alpha-anthraquinonylamine and the arylazo group attached to the third carbon atom of the triazine ring is phenylazo.

No references cited.